United States Patent
Wagner

[11] Patent Number: 6,042,469
[45] Date of Patent: Mar. 28, 2000

[54] AIR CLAMP

[76] Inventor: Rory Wagner, 36933 Cobalt St., Palmdale, Calif. 93552

[21] Appl. No.: 09/270,792

[22] Filed: Mar. 17, 1999

Related U.S. Application Data

[60] Provisional application No. 60/080,753, Apr. 6, 1998.

[51] Int. Cl.[7] .................................................. A22C 17/02
[52] U.S. Cl. .......................... 452/185; 452/125; 269/25; 269/238
[58] Field of Search .................................... 452/125, 128, 452/132, 185; 269/25, 32, 94, 151, 166, 216, 218, 238

[56] References Cited

U.S. PATENT DOCUMENTS

| | | | |
|---|---|---|---|
| 5,226,638 | 7/1993 | Ausilio | 269/238 |
| 5,279,518 | 1/1994 | Ekiss et al. | 452/125 |
| 5,685,770 | 11/1997 | Wood, Sr. | 452/125 |

*Primary Examiner*—Willis Little
*Attorney, Agent, or Firm*—Roger A. Marrs

[57] ABSTRACT

A mechanism for gripping an object employing a set of jaws which are adjusted to fit the size of the object by means of a limit or sizing stop device. The object is gripped by the jaws secured to the end of a stationary lower member while a movable upper member grips the opposite side of the object. A post operably supports a piston which is pivotally connected to the end of the upper member so that the piston, when moved up and down under pneumatic control, causes the jaws to move together or spread apart.

3 Claims, 2 Drawing Sheets

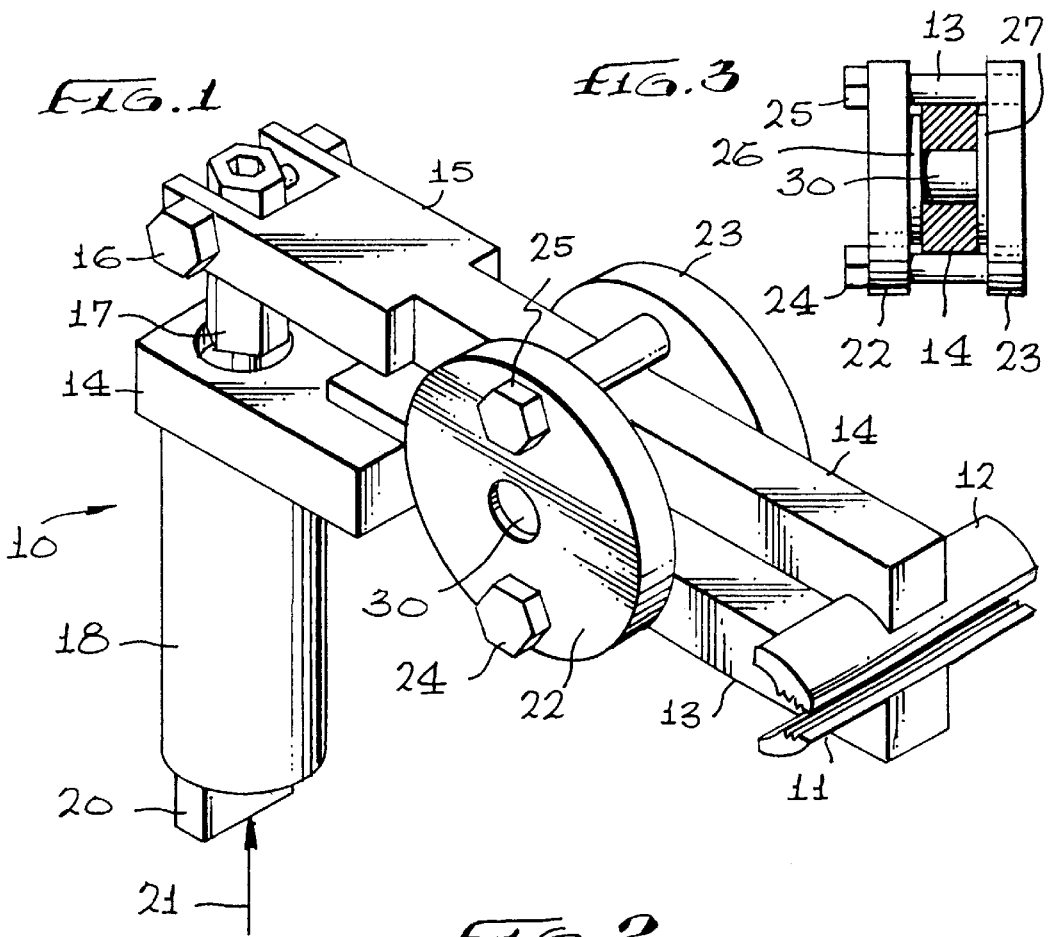
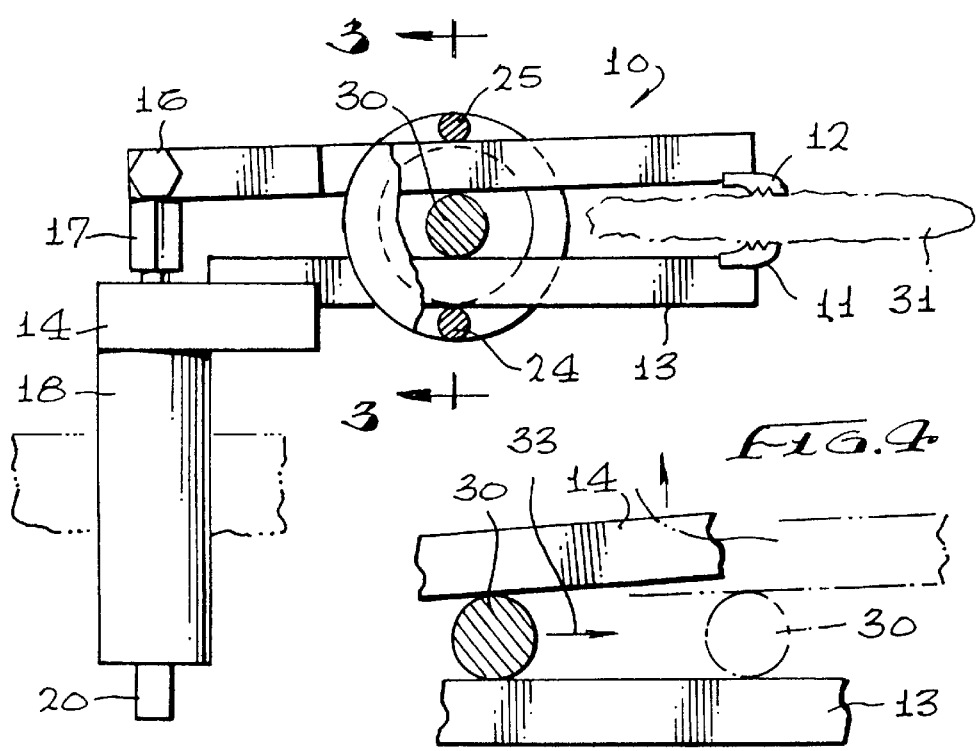

AIR CLAMP

Priority claimed based on Ser. No. 60-080,753 filed Apr. 6, 1998.

BACKGROUND OF THE INVENTION

1. Field of the Invention

The present invention relates to the field of holding mechanisms, and more particularly to a holding mechanism for supporting a fish while the skin stripping operations are performed.

2. Brief Description of the Prior Art

In the past, holding mechanisms have been provided for supporting a variety of fish and animal stripping operations and once such device is disclosed in U.S. Letters Pat. No. 3,866,271. Typically, the mechanism comprises a fish or animal encirclings means cooperating with a holding member having a suspended fixed jaw and usually employs a piston actuated movement for the jaw so that the animal or fish body is releasably secured thereby. Upon insertion of a fish, for example, the piston operated jaw is moved towards the fixed jaw to hold the fish securely from rotational or longitudinal movement while the skin or meat is stripped therefrom.

Problems and difficulties have been encountered with such conventional stripping device which stems from the fact that the device is complicated and difficult to use since the fish holding chuck mechanism includes pistons and hydraulic systems for operation of the jaws. Such a device is expensive and requires stationary support so that the prior device is not portable and not readily transported from place to place and cannot be used for practical purposes at a fishing site.

Therefore, a long-standing need has existed to provide a simplified and portable fish skinning device which will not only hold and support a fish intended to be skinned but will readily adjust to the size of fish by precisely adjusting the holding jaws. Such inventive means must include simplified structure. Piston and cylinder assemblage may be used for ultimate closure of the jaws but means for size adjustment must be mechanical without use of hydraulic or pneumatic operation.

SUMMARY OF THE INVENTION

Accordingly, the above problems and difficulties are avoided by the present invention which provides a novel mechanism for gripping a fish body behind the gills employing a set of jaws which are adjusted to fit the size of the fish by means of a limit or sizing stop means. The fish body is gripped behind the gills by the jaws secured to the end of a stationary lower member while a movable upper member grips the opposite side of the body. A post operably supports a piston which is pivotally connected to the end of the upper member so that the piston, when moved up and down under pneumatic control, causes the jaws to move together or spread apart.

The primary feature of the present invention is the limit or sizing stop means which takes the form of circular side plates which are bolted together by cross bolts and employment of spacer discs which separate the inside surfaces of the plates from the upper and lower jaw members. The limit or sizing stop means, including the side plates, may be moved along the length of the jaw members to determine how wide the jaw opening is to be. Upon moving the limit or sizing means closer to the post and the pivot, minimum spacing is provided between the jaws while moving the means further apart provides maximum opening. The shanks of the bolts engaged with the members serves as a stop for member movement.

Therefore, it is among the primary objects of the present invention to provide a novel fish skinning device that will restrain or hold the fish body from rotational or longitudinal movement while the skin is being stripped from the body.

Another object of the present invention is to provide a novel fish skinning device which employs an adjustable limit or sizing stop means for adjusting the jaws of the holding mechanism without complicated or extensive mechanical construction.

Still a further object of the present invention is to provide a novel portable fish skinning device which may be readily carried by a fisherman and which may be used in situ by the fisherman.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is a front perspective view showing the novel fish skinning device of the present invention;

FIG. 2 is a reduced side elevational view of the fish skinning mechanism shown in FIG. 1;

FIG. 3 is a transverse cross-sectional view of the limit and sizing stop means of the present invention as shown in the direction of arrows 3—3 of FIG. 2;

FIG. 4 is a diagrammatic fragmentary view showing adjustment of the jaw members.

DESCRIPTION OF THE PREFERRED EMBODIMENT

Figure 5:
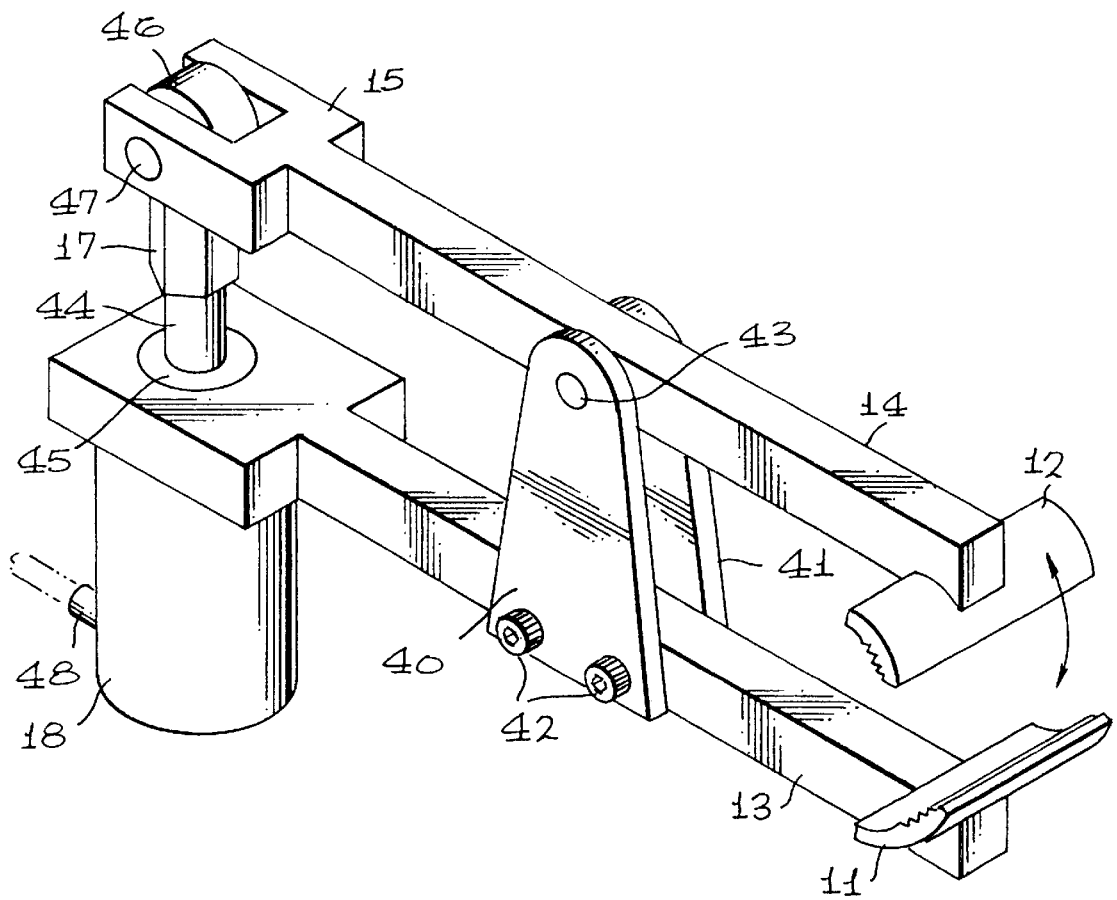
FIG. 5 is a front perspective view of another embodiment of the present invention.

Referring to FIG. 1, the novel fish skinner of the present invention is illustrated in the general direction of arrow 10 which includes a stationary jaw 11 and a movable jaw 12. The stationary jaw 11 is carried on the terminating end of a fixed member 13 which is attached at one end to a base 14. The movable draw 12 is carried on the terminating end of a movable member 14 which terminates at its opposite end in a yoke 15 that is carried by a pivot arrangement 16 to one end of a moving rod or member 17. The movable rod extends through a cylinder 18 which may be operated manually or by pneumatic or hydraulic pressure. By urging the rod 17 upward, by means of application of force 20 in the direction of arrow 21, the yoke causes the movable member 14 to move so that the jaw 12 increases or decreases an opening with respect to the fixed jaw 11. In other words, as the member 20 moves up and down under operator control, the jaw 12 will move with respect to the fixed jaw 11 and the amount of movement is dependent on the position of the member 20.

The inventive concept further includes a limit stop means represented by the circular side plates 22 and 23 that are bolted together by bolts 24 and 25 respectively. Spacer discs 26 and 27, as shown in FIG. 3, separate the inside surfaces of the discs from the upper and lower members 13 and 14. The limit stop means including the side plates may be moved along the length of the members to determine how wide the jaw openings are intended to be. A shaft 30 having its opposite ends connected to the discs 22 and 23 respectively is positioned between the opposing surfaces of the members 13 and 14. Therefore, as the shaft 30 is moved closer to the cylinder 18 or post 17, the pivot provides minimum opening between the jaws while moving closer to the jaws provides maximum opening therebetween. The bolt shanks of bolts 24 and 25 engaging with the members 13 and 14 serve as a stop to member 14 movement.

Referring now in detail to FIG. 2, it can be seen that the shaft 30 is disposed between the opposing surfaces of the upper member 14 and the fixed lower member 13. The jaws 11 and 12 are illustrated as having the body of a fish gripped between the opposing narrowed or grooved surfaces of the jaws and such a fish is indicated by numeral 31. It can also be seen in FIG. 2 that the members 13 and 14 are captured between the bolts 24 and 25 respectively with the shaft 30 extending therebetween.

Referring now in detail to FIG. 4, it can be seen how the position of the shaft 30 controls the opening between the jaws 11 and 12. As the shaft is moved rearwardly towards the post 17, the movable member 14 is elevated to open the distance between the jaws. However, when the shaft 30 is moved outwardly towards the jaws in the direction of arrow 33, the opening between the jaws is reduced and closure on the body 31 takes place.

In view of the foregoing, it can be seen that the novel skin removing device of the present invention provides a means for completely supporting and holding the fish in position for skinning. The size of the fish can be readily accommodated by the movement of the limit stop means towards or away from the jaws 11 and 12. The operation of the movable arm or member 14 may be by any suitable mechanical device which imparts a linear force to the member 20.

FIG. 5 shows an alternate embodiment wherein the discs 22 and 23 are replaced with stationary members 40 and 41 that are bolted to the base 13 by fasteners such as fastener 42. A pin 43 pivotally mounts arm 14 and the jaws 11 and 12 move together and apart as the arm pivots in response to linear movement of piston 44. A sealed bearing 45 supports the piston and an eye-bolt 46 is pivotally coupled to the end of arm 14 by a suitable bearing or journal. Number 47 indicates a pivot pin.

Pressure for moving the piston is introduced via inlet port 48. Nut 17 serves as a stop when engaged with the surface of the sealed bearing 45.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A mechanical grip for holding an object comprising the combination of:

a stationary base having opposite ends;

an elongated arm having opposite ends arranged in spaced-apart relationship with respect to said stationary base;

support means coupling said arm with said base midway between said opposite ends of said arm and said base respectively;

pneumatic means connected between selected ends of said arm and said base for moving said arm about said support means;

non-selected ends of said arm and said base each fixedly provided with a jaw cooperating to grip an object in a tight and releasable grasp;

said support means includes a pair of fixedly spaced-apart upright members having ends terminating in a pivot for movably supporting said arm;

said support means includes a pair of discs separated by said base and having a pivot pin connecting said discs together and wherein said pivot pin is disposed between said base and said arm whereby said arm teeters thereon; and stop means connected between said discs above and below said arm and said base respectively for limiting movement of said arm.

2. The mechanical grip defined in claim 1 including:

pneumatic power means interconnecting said base with said arm for opening and closing said jaws.

3. The mechanical grip defined in claim 1 including:

pneumatic means disposed between said base and said arm;

an eye-bolt carried on an end of a piston driven by said power means;

said eye-bolt coupled to said arm by a pivot bearing; and a stop nut mounted on said piston for limiting movement of said arm for opening and-closing said jaws.

* * * * *